United States Patent Office 3,036,876
Patented May 29, 1962

3,036,876
LINEAR POLYESTERS DYED WITH 3'-HYDROXY-QUINOPHTHALONE DYESTUFFS
Alfred Schoellig, Mutterstadt, Pfalz, and Karl Georg Roessler and Reinhold Kralimann, Ludwigshafen (Rhine), Germany, assignors to Badische Anilin- & Soda-Fabrik Aktiengesellschaft, Ludwigshafen (Rhine), Germany
No Drawing. Filed July 31, 1959, Ser. No. 830,716
Claims priority, application Germany Aug. 2, 1958
10 Claims. (Cl. 8—55)

This invention relates to colored structures of linear polyesters and a process of coloring structures of polyesters. Particularly, this invention relates to structures of linear polyesters colored in a bath, by padding or printing with certain 3'-hydroxyquinophthalone dyestuffs.

We have found that deep dyeings having very good properties are obtained on structures of linear polyesters by using dyestuffs of the formula

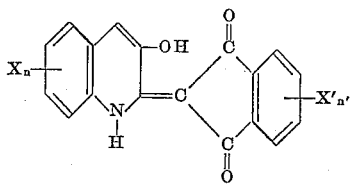

in which each of X and X' represents a halogen atom or analkyl, alkoxy, aryl or cyano group and each of $n$ and $n'$ represents one of the numbers 0, 1 and 2, at least one of $n$ and $n'$ being other than zero.

The dyestuffs of the said formula are for the most part new. They may be obtained in various ways, for example as follows:

(I) They can be prepared by condensation of definite derivatives of phthalic acid containing halogen atoms or alkyl, alkoxy, aryl or cyano groups, as for example 3- or 4-chloro- or -bromophthalic acid, 3,4-, 3.5- or 3,6-dichloro- or -dibromophthalic acid and the corresponding alkyl, alkoxy, aryl and cyano derivatives, with 2-methyl-3-hydroxy-quinoline or derivatives thereof containing one or 2 halogen atoms or alkyl, alkoxy, aryl and/or cyano groups in 4-, 5-, 6-, 7- and/or 8-position; unsubstituted phthalic acid may also be condensed with the said quinoline derivatives.

(II) Even better results are achieved, however, when more of the said substituents are subsequently introduced into the products of the above-mentioned condensation reactions, provided they contain less of the above-named substituents than correspond to the general formula, or into the product of the condensation of phthalic acid and 2-methyl-3-hydroxyquinoline itself. In some cases there may thus be formed, side by side, two or more dyestuffs in a mixture which falls within the general formula. This introduction of further substituents may be effected for example by subsequent halogenation and if desired by the replacement of halogen atoms by alkoxy groups (for example by means of alcoholates), cyano groups (by means of alkali cyanides) and alkyl or aryl groups (for example by means of lithium alkyl or aryl compounds, as for example, lithium methyl, lithium butyl or lithium phenyl). By working in this way, the production of the above-mentioned phthalic acid and 3-hydroxyquinoline derivatives which contain the substituents according to this invention in defined positions, which in some cases is difficult and expensive, is avoided. The process according to (II) has quite special advantages when the introduction of the substituents according to this invention is carried out in the same reaction vessel as the previous condensation, for example by leading chlorine or bromine vapor into the condensation vessel.

In all these reactions there may be used, instead of phthalic acid and its derivatives, the corresponding phthalic anhydrides, amides and imides, and instead of 2-methyl-3-hydroxyquinoline and its derivatives there may be used the corresponding 2-methyl-3-hydroxyquinoline-4-carboxylic acids; in the latter case, the carboxylic acid group is split off during the condensation.

With the resultant dyestuffs, which, of course, may also be used in admixture with one another or with other known polyester dyestuffs, it is possible to color structures, such as flocks, fibers, threads, foils, bonded fabrics, felts, woven and knitted fabrics of linear polyesters, and the term coloring is intended to include dyeing from a bath, dyeing by padding, and also the local dyeing such as is effected by printing.

The term linear polyesters relates to synthetic macro-molecular fiber- and film-forming compounds, the molecules of which have recurrent radicals of a dibasic carboxylic acid and of a dihydroxy compound, the carboxyl group and the hydroxy group forming ester linkages. The dibasic carboxylic acid is, for example, of the aromatic type, such as terephthalic acid. The dihydroxy compound is, for example, linear aliphatic glycol, such as ethylene glycol, or a cycloaliphatic glycol, such as dimethylol cyclohexane.

For bath dyeing or padding, the dyestuffs may advantageously be used in finely divided form and at temperatures of about 80° to 100° C., preferably with the co-employment of dyeing accelerators (carrier substances), such as benzoic acid, ortho-hydroxybenzoic acid, their methyl esters, diphenyl or its 2- or 4-hydroxy derivatives. Furthermore, the dyeing can also be carried out at temperatures above 100° C. under increased pressure, with or without the use of dyeing accelerators.

For local dyeing by printing, the dyestuffs are used in admixture with thickening agents and preferably carrier substances, the printed material dried and treated for a short time with hot air or steam.

According to the new process, colorings of very good wet fastness properties and of excellent thermal stability (for example fastness to sublimation, thermofixing, ironing and pleating) are obtained. The fastness to light is also very good.

Especially to be emphasized are the properties of the dyestuffs to be prepared in a specially simple way (as described under (II) above) by condensation and subsequent introduction of the substituents according to this invention. It is very surprising that these dyestuffs, consisting in some cases of two (or more) chemical individuals, often yield especially pure and fast dyeings. In the case of the said dyestuff mixtures this is only possible because, apart from the said tinctorial properties, the affinity, levelling and fastness properties of the individual dyestuffs are not deteriorated by using them in a mixture. What is more, the tinctorial properties of these mixtures which are prepared in a specially simple manner, are better than those of the individual dyestuffs, i.e., a kind of "synergistic effect" takes place. This is in fact a very rare phenomenon, which could not be foreseen.

According to U.S. patent specification No. 2,818,410 quinophthalones of the general formula:

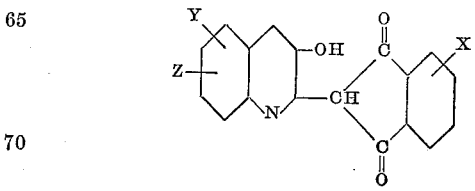

in which X represents a nitro or amino group and Y and Z hydrogen, chlorine or bromine atoms or methyl groups, can be used to dye hydrophobic fibers, as for example polyester fibers.

In the examples of the said patent specification there are specified two isomeric nitro-3'-hydroxyquinophthalones and some derivatives of these compounds which contain methyl groups or chlorine or bromine atoms. The last-mentioned compounds containing bromine only go on to polyester fibers in an extremely small degree; even when used in very high concentration, they do not give dyeings but only a somewhat intensified staining of the fibers.

The nitro-3'-hydroxyquinophthalones containing chlorine described in the said patent specification, in contrast to their analogues containing bromine, go on to polyester fibers although substantially less strongly than the dyestuffs described in the present application. However, the said compounds containing chlorine give, depending on the concentration in which they are used, dyeings of shades of color which differ unusually strongly from each other, namely yellow shades at the low dyestuff concentrations, but red-orange shades at higher concentrations; this is a property which makes them unsuitable for use in a dyestuff assortment. Moreover, the fastness to light and especially also the constancy of the shade of color of these dyeings upon exposure to light are defective. Even after exposure for 4 hours to light there is not only a considerable decrease in color strength, but above all a very marked change of the shade of color toward the yellow side of the spectrum.

The two isomeric nitro-3'-hydroxyquinophthalones of Examples 1 and 2 of the said U.S. patent specification are constitutionally more different from the dyestuffs described in the present application than the known compounds hitherto specified. They go on to polyester fibers far less strongly than the dyestuffs of the present application and yield orange to red-yellow dyeings. The fact that the dyestuffs herein described have a better substantivity than those of the said U.S. patent specification and that they supplement the orange to red-yellow shades of color of the known dyeings by neutral yellow, very pure dyeings of excellent fastness properties, was obviously not known by the applicant for the said U.S. patent. The supplement to the palette of known dyestuffs, which is very limited as regards their shades of color, which is achieved by the use of the dyestuffs herein described is of high value, especially because the dyers require the producers of dyestuffs to provide for dyestuffs of all shades of color to be combinable with one another as well as possible, i.e. to ensure that they have the same affinity curves and levelling and fastness properties. This requirement of dyeing practice is based above all on the fact that by far the most dyeings used in practice are produced with the aid of dyestuff combinations, i.e., with two or more dyestuffs contained at the same time in the dyebath or printing paste. Naturally, this requirement is most easily fulfilled when dyestuffs of similar chemical constitution but at the same time of divergent shades of color can be used together. The dyestuffs described in the present application can in fact be combined very well with the known dyestuffs and therefore represent a considerable technical advance in that they provide new possibilities for the production of combination (compound) dyeings which are especially important in practice on polyester fibers.

The following examples will further illustrate this invention but the invention is not restricted to these examples. The parts specified in the examples are parts by weight. To indicate the positions of the quinophthalone ring system, the following scheme, closely following the designation of the initial materials, will be used:

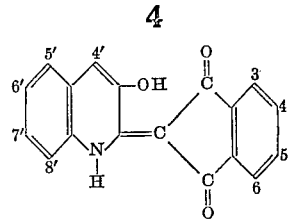

*Example 1*

100 parts of polyethylene terephthalate fabric are dyed for 90 minutes at the boiling temperature in a bath of 0.3 part of the dyestuff having the formula

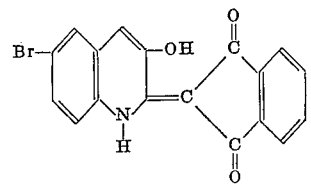

and a melting point of 295° C. obtained by condensation of 2-methyl-3-hydroxy-6-bromoquinoline with phthalic anhydride, and 4 parts of finely divided 2-hydroxydiphenyl in 3000 parts of water. After vigorous rinsing, the fabric is treated in a bath of 3 parts of about 32% sodium hydroxide solution and 3 parts of sodium dithionite in 3000 parts of water for 15 minutes at 80° C.

Powerful yellow dyeings of excellent fastness to light, good to very good wet fastness properties and excellent thermal stability are obtained.

*Example 2*

100 parts of a bonded fabric of polyester fibers are dyed for 90 minutes at the boiling temperature in a bath of 0.3 part of the dyestuff of the formula

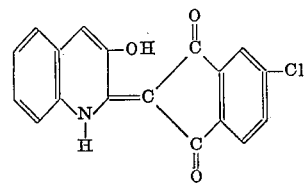

which melts at 248–250° C. and which has been obtained by condensation of 2-methyl-3-hydroxyquinoline-4-carboxylic acid with 4-chlorophthalic anhydride, and 4 parts of finely divided 2-hydroxydiphenyl in 3000 parts of water. After vigorous rinsing, the fabric is treated in a bath of 3 parts of about 32% sodium hydroxide solution and 3 parts of sodium dithionite in 3000 parts of water for 15 minutes at 80° C.

Powerful yellow dyeings of very good wet fastness properties and very good fastness to sublimation, thermofixing and ironing, and also excellent fastness to light are obtained.

*Example 3*

100 parts of polyethylene terephthalate flocks or threads are dyed for 1 hour at 125° C. in a pressure vessel in a bath of 0.3 part of the dyestuff obtained by condensation of 2 - methyl - 3 - hydroxyquinoline with phthalic anhydride with subsequent chlorination up to a chlorine content of 1 atom in each molecule and 2 parts of the product obtained by reaction of 1 mol of sperm alcohol with 80 mols of ethylene oxide and subsequent sulfonation, in 2000 parts of water.

Powerful clear yellow dyeings are obtained which have very good wet fastness properties and excellent fastness to light.

*Example 4*

Polyester fabric is printed with a paste of 3 parts of a finely divided dyestuff consisting of monobrom-3'-hydroxyquinophthalone of the melting pooint 192° C. obtained by condensation of 2-methyl-3-hydroxyquinoline with phthalic acid and bromination of the 3'-hydroxyquinophthalone, 200 parts of British gum, 30 parts of 4-hydroxydiphenyl, 90 parts of ethyl alcohol and 680 parts of water, then dried and steamed for 15 minutes at 1.5 atmospheres excess pressure.

Clear greenish yellow print dyeings of very good wet fastness properties and excellent fastness to light are obtained.

Equally valuable dyeings may also be obtained with mixtures of monobrom- and dibrom-3'-hydroxyquinophthalones which may be obtained either by brominating 3'-hydroxyquinophthalone up to a content of 1 to 2 bromine atoms, or by mixing together mono- and dibrom-3'-hydroxyquinophthalones with defined position of the bromine atoms prepared as described under (I) above.

Example 5

100 parts of a woven or knitted fabric of polyester fibers is dyed in a pressure vessel for 1 hour at 125° C. in a bath of 0.3 part of the dyestuff of the formula

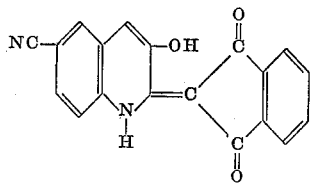

and the melting point 208° C. prepared by condensation of 2-methyl-3-hydroxy-6-bromoquinoline with phthalimide and reaction of the compound thus obtained with potassium cyanide, and 2 parts of the product obtained by reaction of 1 mol of sperm oil alcohol with 80 mols of ethylene oxide and subsequent sulfonation, in 2000 parts of water.

Yellow dyeings of excellent fastness to light, very good wet fastness properties and very good thermal stability are obtained.

Example 6

Polyethylene terephthalate fabric is printed with a paste of 3 parts of the finely divided dyestuff of the formula

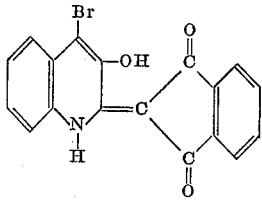

200 parts of British gum, 30 parts of 4-hydroxydiphenyl, 90 parts of ethyl alcohol and 680 parts of water. The fabric is then dried and steamed for 30 minutes at 0.5 atmosphere excess pressure.

Clear greenish yellow print dyeings of very good wet fastness properties and excellent fastness to light are obtained.

Example 7

100 parts of polyester foil is dyed for 90 minutes at the boiling temperature in a bath of 1 part of the finely divided dyestuff of the formula

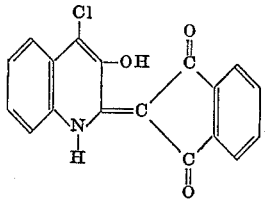

and 1 part of the sulfuric acid ester salt obtained by sulfonation of the adduct of 80 mols of ethylene oxide to 1 mol of sperm oil alcohol, in 3000 parts of water.

Clear yellow dyeings of excellent fastness to light and very good thermal fastness properties (for example fastness to sublimation) are thus obtained.

Example 8

100 parts of a felt of polyester fibers are dyed for 90 minutes at the boiling temperature in a bath of 0.3 part of the dyestuff of the formula

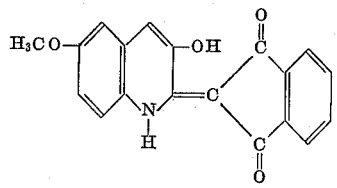

and a melting point of 210–212° C. obtained by condensation of 2-methyl-3-hydroxy-6-bromoquinoline with phthalamide and reaction with sodium methylate, and 24 parts of finely divided methyl salicylate in 3000 parts of water.

After vigorous rinsing, the felt is treated in a bath of 3 parts of about 32% sodium hydroxide solution and 3 parts of sodium dithionite in 3000 parts of water for 15 minutes at 80° C.

Powerful yellow dyeings of very good wet fastness properties, good fastness to sublimation, thermofixing and ironing and excellent fastness to light are obtained.

The following shades of color are also obtained with the following dyestuffs on structures of polyesters according to the methods described in Examples 1 to 8:

3'-hydroxy-4.6'-dichlorquinophthalone _____ Yellow
3'-hydroxy-4.6'-dibromoquinophthalone _____ Yellow
3'-hydroxy-6'-chlorquinophthalone _____ Yellow
4-chlor-3'-hydroxy-6'-bromoquinophthalone ____ Yellow
4-brom-3'-hydroxy-6'-chlorquinophthalone _____ Yellow

What we claim is:

1. A structure comprising a linear polyester colored with a dyestuff of the formula

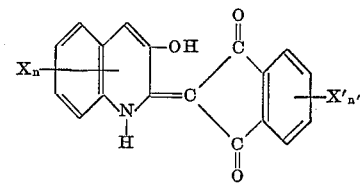

wherein both X and X' represent a member selected from the group consisting of chloro and bromo, and n and n' each represent an integer of from 0 to 2, inclusive, at least one of said n and n' being different from zero.

2. A structure comprising a linear polyester colored with a dyestuff of the formula

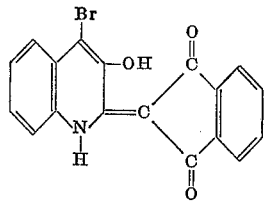

3. A structure comprising a linear polyester colored with a dyestuff of the formula

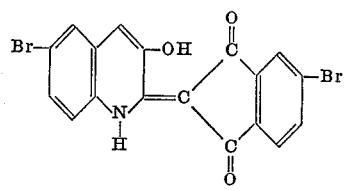

4. A structure comprising a linear polyester colored with a dyestuff of the formula

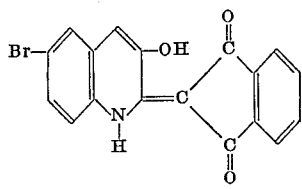

5. A structure comprising a linear polyester colored with a dyestuff of the formula

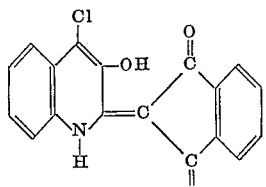

6. A structure comprising a linear polyester colored with a dyestuff of the formula

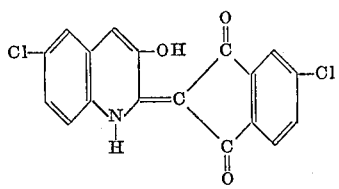

7. A structure comprising a linear polyester colored with a dyestuff of the formula

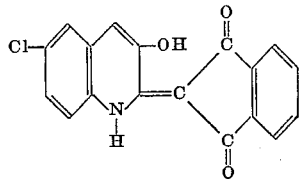

8. A structure comprising a linear polyester colored with a dyestuff of the formula

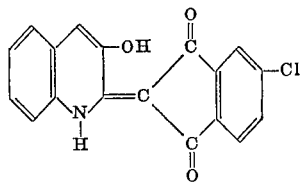

9. A structure comprising a linear polyester colored with a dyestuff of the formula

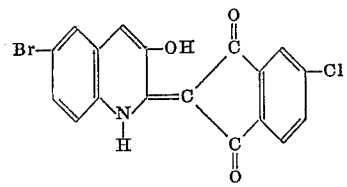

10. A structure comprising a linear polyester colored with a dyestuff of the formula

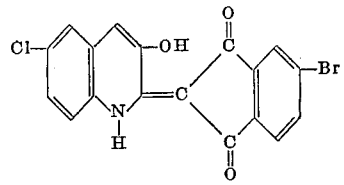

References Cited in the file of this patent
UNITED STATES PATENTS
2,818,410    Zwilgmeyer _____ Dec. 31, 1957
FOREIGN PATENTS
429,176    Great Britain _____ May 20, 1935
OTHER REFERENCES
Rodd: Chemistry of Carbon Compounds, vol. IV, Part A, p. 638 (1957).